United States Patent
Sonderegger

(10) Patent No.: US 7,805,711 B2
(45) Date of Patent: Sep. 28, 2010

(54) REDIRECTION INTERFACE SYSTEM AND METHOD FOR CIM OBJECT MANAGER PROVIDER

(75) Inventor: Kelly Ervin Sonderegger, Santaquin, UT (US)

(73) Assignee: Novell, Inc., Provo, UT (US)

( * ) Notice: Subject to any disclaimer, the term of this patent is extended or adjusted under 35 U.S.C. 154(b) by 1105 days.

(21) Appl. No.: 11/490,226

(22) Filed: Jul. 19, 2006

(65) Prior Publication Data

US 2008/0066060 A1    Mar. 13, 2008

(51) Int. Cl.
*G06F 9/45*    (2006.01)

(52) U.S. Cl. ............... 717/140; 717/145; 717/147; 717/104

(58) Field of Classification Search .......... 717/140
See application file for complete search history.

(56) References Cited

U.S. PATENT DOCUMENTS

| 6,862,736 B2 * | 3/2005 | Hudis et al. ............. 719/316 |
| 6,871,346 B1 * | 3/2005 | Kumbalimutt et al. ...... 718/104 |
| 6,971,090 B1 * | 11/2005 | Gruttadauria et al. ....... 717/136 |
| 2004/0068733 A1 * | 4/2004 | Longbardi ............. 719/316 |

* cited by examiner

*Primary Examiner*—Thomas K Pham
(74) *Attorney, Agent, or Firm*—Haynes and Boone, LLP

(57) ABSTRACT

System and method are described for an I/O redirection provider for rapidly adapting legacy services, such as Linux services, into CIM management space. In one embodiment, a method of implementing an I/O redirection provider in a management system including a Common Input Model Object Manager ("CIMOM") comprises, for each of a number of script files, determining whether a class corresponding to the script file exists; responsive to a determination that a class corresponding to the script file does not exist, selectively using at least one template to generate a new schema for the script file; and compiling the new schema within the CIMOM.

20 Claims, 2 Drawing Sheets

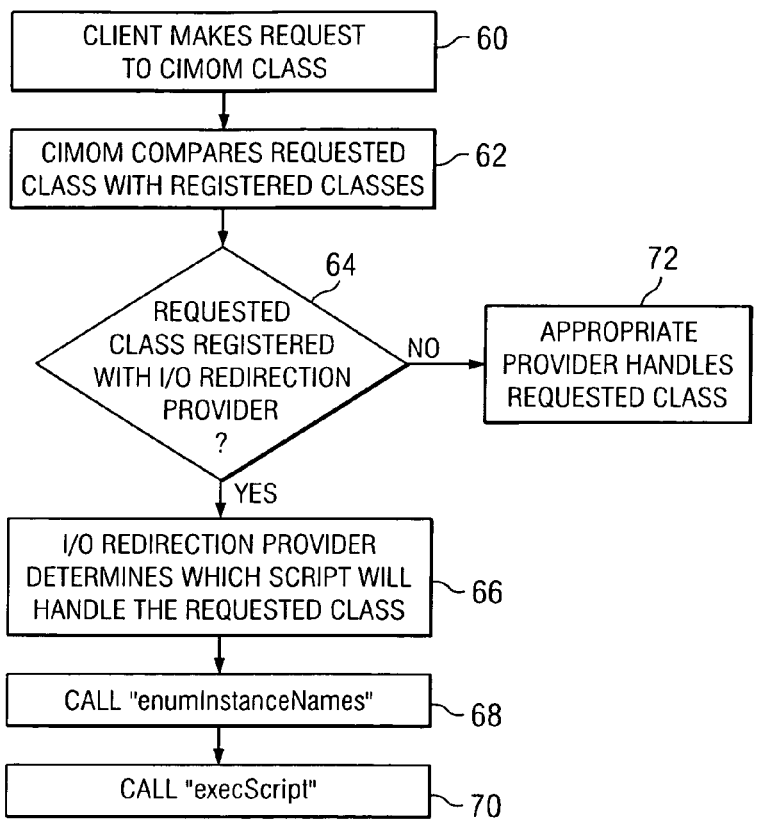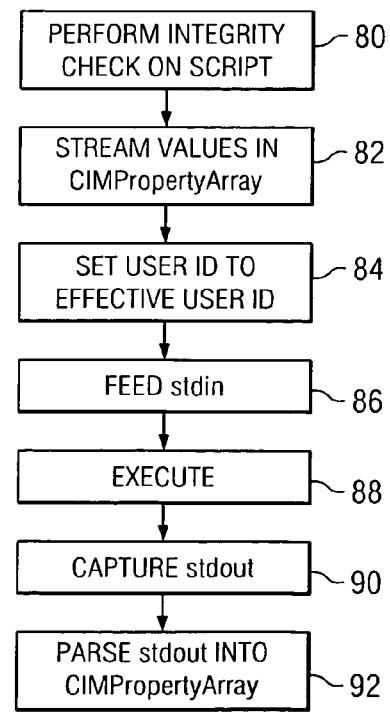

REDIRECTION INTERFACE SYSTEM AND METHOD FOR CIM OBJECT MANAGER PROVIDER

BACKGROUND

Common Information Model ("CIM") is a standard set forth by the Distributed Management Task Force ("DMTF") that allows for a common model of providing information regardless of hardware or operating system ("OS") platform. CIM provides a common definition of management information for systems, networks, applications and services and allows for vendor extensions thereto. CIM is a vendor-agnostic industry management standard. A CIM object manager ("CIMOM"), such as Web-Based Enterprise Management ("WBEM"), is essentially a server for servicing CIM requests.

CIM is comprised of a Specification and a Schema. The CIM Schema provides the actual model descriptions, while the CIM Specification defines the details for integration with other management models. In particular, the CIM Schema comprises a set of classes with properties and associations that provide a well-understood conceptual framework within which it is possible to organize the available information about the managed environment. The formal definition of the CIM Schema is expressed in a Managed Object File ("MOF"), which is an ASCII or UNICODE file that can be used as input into a MOF editor, parser, or compiler for use in an application. The Unified Modeling Language ("UML") is used to visually portray the structure of the CIM schema. CIM defines the data that is transported via the encoding and transport definitions of the CIMOM (e.g., WBEM).

The CIM Schema is structured into three distinct layers. These include a Core Schema, Common Schemas, and Extension Schemas. The Core Schema is an information model that captures notions that are applicable to all areas of management. Common Schemas are informational models that capture notions that are common to particular management areas, but are independent of technology or implementation. Extension Schemas represent organizational- or vendor-specific extension of the Common Schema.

A CIM provider provides on a CIM platform data representing a single entity. In the case of hardware, there will theoretically be an instance of a CIM object representing each component, including, for example, each processor, video card, etc. Hardware data is derived from multiple sources, including, but not limited to, Intelligent Platform Management Interface ("IPMI"), Hardware Abstraction Layer ("HAL"), System Management BIOS ("SMBIOS"), sysfs, and proprietary third party sources. Each of these sources has its own interface, some of which are very complex. There could be a representation of each component in only one, many, or all of the available data sources.

The process of developing managed services is very tedious and time consuming with current language-bound CIM providers. Additionally, there is a need for legacy services, such as Linux services, to be managed in a fashion that does not require the service itself to change.

SUMMARY

In response to these and other problems, in one embodiment, system and method are provided for an I/O redirection provider for rapidly adapting legacy services, such as Linux services, into CIM management space. In one embodiment, a method of implementing an I/O redirection provider in a management system including a Common Information Model Object Manager ("CIMOM") comprises, for each of a number of script files, determining whether a class corresponding to the script file exists; responsive to a determination that a class corresponding to the script file does not exist, selectively using at least one template to generate a new schema for the script file; and compiling the new schema within the CIMOM.

BRIEF DESCRIPTION OF THE DRAWINGS

FIG. 3 is a flowchart illustrating operation of the I/O redirection provider in response to a request from the CIMOM in accordance with one embodiment.

FIG. 4 is a flowchart illustrating operation of an execScript method in accordance with one embodiment.

DETAILED DESCRIPTION

This disclosure relates generally to CIMOMs and, more specifically, to system and method for rapidly adapting legacy services, such as Linux services, into CIMOM space. In one embodiment, legacy services (e.g., open source types of services readily available on Linux) are conformed to the industry CIM standard via an I/O redirection provider. As will be described in greater detail hereinbelow, the I/O redirection provider automatically handles a number of functions for a developer. For example, if the developer creates a script file using a standard naming convention (e.g., "xyzRemoteService.sh" or "xyzService.sh"), the I/O redirection provider will automatically generate standard schema into the CIMOM. Then, using simple I/O statements, the CIMOM will be "fed" information via the script.

As a result, the embodiments described herein enable legacy Linux services to be rapidly modified into CIM-managed services. Using the I/O redirection provider, developers can choose to script in any scripting language they choose, as the I/O redirection provider is scripting language indifferent, so long as they the script file name complies with the standard naming convention. In addition, if a schema does not exist for the particular script, it can be generated automatically, thereby relieving developers of the tedious task of schema definition and creation in the CIMOM for cases in which the schema has a template definition provided. This also ensures that developers do not stray from the CIM standard in their own development.

Figure 1:
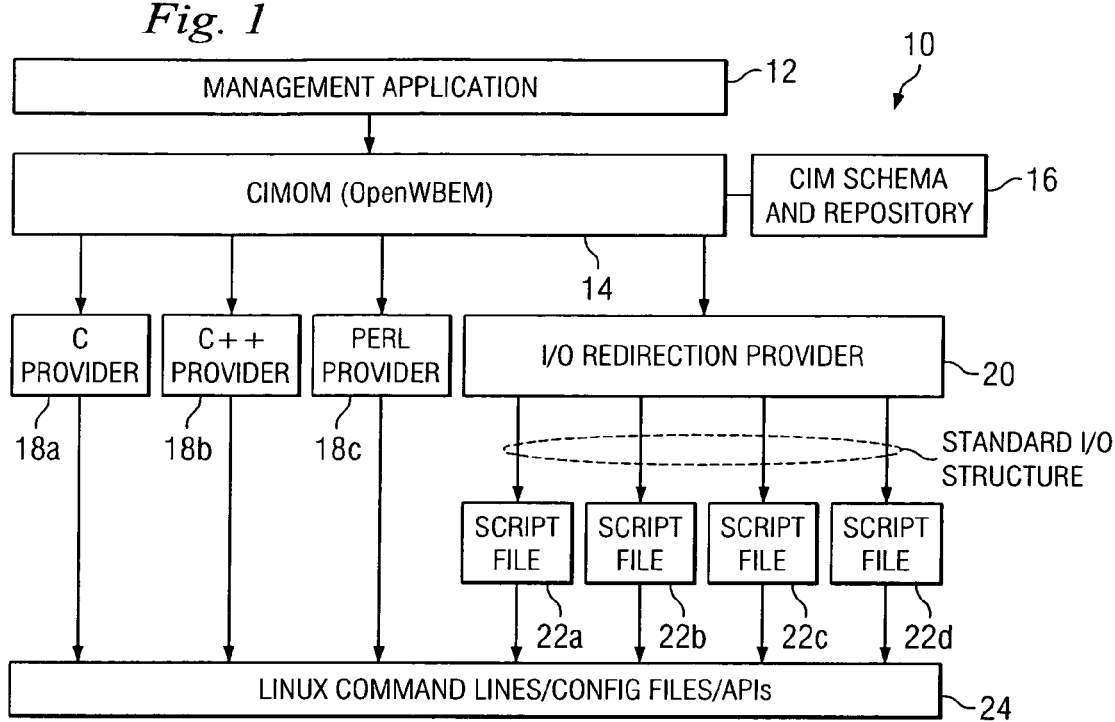
FIG. 1 is a block diagram of a management system in which an embodiment of an I/O redirection provider is advantageously implemented.

FIG. 1 is a block diagram of a management system 10 in which an embodiment of an I/O redirection provider is advantageously implemented. The system 10 includes a management application 12 that obtains management data via a CIMOM, 14, which in a preferred embodiment is implemented using Open WBEM. The CIMOM 14 has access to a CIM schema and repository 16. A plurality of language-specific (e.g., C, C++, and Perl) providers 18a-18c are connected to the CIMOM 14. Additionally, In accordance with features of the embodiments described herein, an I/O redirection provider 20 provides an interface between providers, or script files, 22a-22d, which may be scripted in any language, via a standard I/O structure. As noted above, the providers 22a-22d are .sh files named in accordance with a standard naming convention. The providers 22a-22d publish data derived from one of a variety of data sources, such as Linux command lines, configuration files, and APIs, 24.

An embodiment will now be described in detail below using an example in which a developer interacts with the embodiment to add or adapt a Linux service to become CIM managed. First, the developer selects a language, such as C, C++, or perl, in which to script. The developer then needs to create a schema for the managed service and conform to the C, C++, or perl API in order to adapt the service into the CIMOM space. This language-bound API is rather complex for most developers to implement and the learning curve is steep. Therefore, in accordance with an embodiment, to simplify the process, naming conventions are used to enable schema to be automatically generated for most developer scenarios. In addition, once the schema is generated, the developer uses a properly named script, or script file, to quickly implement a provider definition.

Using a mail service as an example, the developer creates a file with a particular postscript in a specified "provider scripts" directory. When the CIMOM initializes, it looks up a generic template of classes for the naming and generates all the necessary classes within the CIMOM. Within the provider scripts directory, the developer creates the corollary files with the .sh naming. Within the .sh files, the developer can use whatever scripting language they prefer, but they must comply with a predefined format. An example is provided hereinbelow.

```
#!/bin/sh
#This is the master control for applying the new configuration to the
operating system
debug=0
        #0=no debug.
        #1=print status messages.
        #2=just print input and stop.
##-----------------
Constant paths
##-----------------
##-----------------
Internal Funcs
##-----------------
error( )
{
   echo "ERROR:$1"
}
warning( )
{
   echo "####WARNING:$1####"
}
DebugPrint( )
{
   If [$debug –ge 1]; then
       echo –e "#####Debug($debug):$1 #####\n"
   fi
}
##-----------------
##Begin Invokable Methods
##-----------------
StartService( )
{
   DebugPrint "***************"
   DebugPrint "Start called."
   DebugPrint "***************"
   DebugPrint "Name=$Name"
   nboap –gw
}
StopService ( )
{
   DebugPrint "***************"
   DebugPrint "Start called."
   DebugPrint "***************"
   DebugPrint "Name=$Name"
   /etc/init.d/nboemaild stop
}
##-----------------
```

```
End Invokable Methods
##-----------------
ModifyInstance ( )
{
   if["$Name" !=$MY_INSTANCE_NAME]; then
       echo "EXEC_CIM_ERROR_MSG=Instance $Name not found"
       echo "EXEC CIM ERROR=4"
       return
   fi
   DebugPrint "Name=$Name"
   echo "Name=$Name"
   if["$Started" = "false"]; then
       chkconfig –d nboemaild
       DebugPrint "Started is=$Started"
   else
       if["$Started" = "true"]; then
           chkconfig –a nboemaild
           DebugPrint "started is true"
       fi
   fi
}
EnumerateInstanceNames( )
{
   echo "beginKey"
   echo "Name=$MY_INSTANCE_NAME"
   echo "endKey"
}
GetInstance( )
{
   if["$Name"!=$MY_INSTANCE_NAME]; then
       echo "EXEC_CIM_ERROR_MSG=Instance $Name not found"
       echo "EXEC_CIM_ERROR=4"
       return
   fi
   DebugPrint "Name=$Name"
   echo "Name=Name"
   if chkconfig –1 nboemaild | grep –q "3:on"
   then
       Started=true
   else
       Started=false
   fi
   DebugPrint "Started=$Started"
   if ["$Started"="true"]; then
       echo "Started=true"
       echo "HealthState=5"
       echo "Status=OK"
       echo "OperationalStatus=11"
   else
       echo "Started=false"
       echo "HealthState=0"
       echo "Status=Unknown"
       echo "OperationalStatus=10"
   fi
   Enable="false"
   if [$Enable="true"]; then
       echo "EnabledState=2"
   else
       echo "EnabledState=3"
   fi
}
MY_INSTANCE_NAME_="Novell_LinuxNBOEmailRemoteService"
CONFFILE=""
declare –i index=0
declare –a lines

Startup . . .

DebugPrint "Executing $0 $1"
DebugPrint "Evaluating properties . . ."
while (true); do
   read LINE
   if["$LINE" = "exit"]||
       echo $LINE | grep –vq "="; then
       break
   fi
   if [$debug –ge 1]; then
       DebugPrint "$LINE"
   fi
```

-continued

```
eval "$LINE"
    echo $LINE | grep -e '^ACTION='>/dev/null
        if [$? -ne0]; then
            lines[$index]=$ {LINE}
            index=$index+1
        fi
done
if [$debug -ge2]; then
    warning "Debug mode; not applying changes to OS."
        #Close stdout, so CIMOM provider will stop reading
        >&-
    exit 1
fi
if ['whoami'!="root"]; then
    error "You are not root; not applying changes to OS"
        #Close stdout, so CIMOM provider will stop reading
        >&-
    exit1
fi

##Script handles three actions MODIFY_INSTANCE,
ENUM_INSTANCE_NAMES,
##GET_INSTANCE

DebugPrint "ACTION=$ACTION"
if ["$ACTION" = "MODIFY_INSTANCE"]; then
    ModifyInstance
elif ["$ACTION" = "ENUM_INSTANCE_NAMES"]; then
    EnumerateInstanceNames
elif ["$ACTION" = "INVOKE_METHOD"]; then
    GetInstance
elif ["$ACTION" = INVOKE_METHOD"]; then
    DebugPrint "Name = $Name"
    if [$Name" ! = $MY_INSTANCE_NAME]; then
        echo "EXEC_CIM_ERROR_MSG=Instance $Name not found"
        echo "EXEC_CIM ERROR=4"
    else
        # call the method
        $METHOD_NAME
    fi
else
    error "ACTION=$ACTION not set or not handled!"
fi
#Close stdout, so CIMOM provider will stop reading
>&-
DebugPrint "Exiting $0"
exit 0
```

Some key concepts to observe from the above-noted example are illustrated in the "getInstance" method. For example, the "echo 'OperationalStatus=10'" statement will translate into a CIM OperationStatus property that has a value of 10. This makes it very easy to obtain information from standard Linux files and transform them into CIM properties. In a similar manner, CIM methods are implemented, such as the StartService and StopService methods. Because the system is script-oriented, a validity checker is used to test for tampering against any of the CIM scripts. It should also be noted that the system has been used to create a readily scriptable alerting system within CIM as well.

Figure 2:
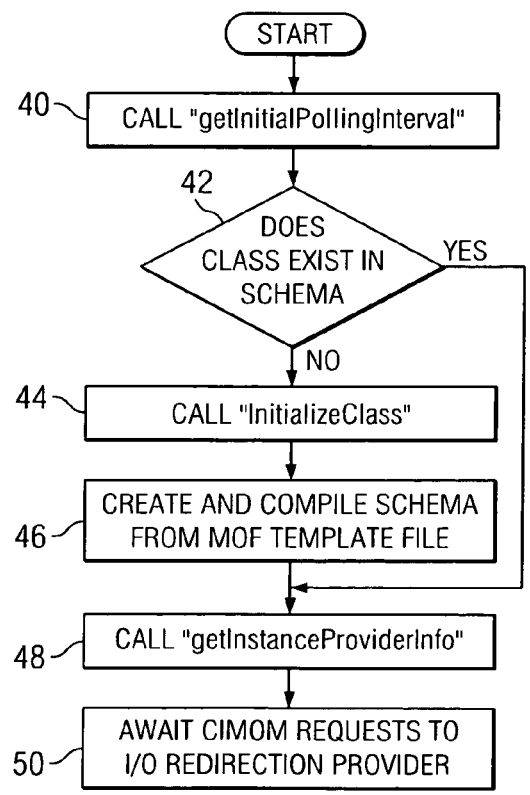
FIG. 2 is a flow diagram illustrating operation of the I/O redirection provider 20 in accordance with one embodiment.

FIG. 2 is a flow diagram illustrating operation of the I/O redirection provider 20 in accordance with one embodiment. When the system 10 is first starting up, the CIMOM 14 needs to get an idea of what classes it is expected to handle; the same is true for the I/O redirection provider 20. In step 40, the I/O redirection provider 20 calls a method designated "getInitialPollingInterval" for each of the script files 22a-22d. The getInitialPollingInterval method looks up all class script files. In step 42, a determination is made if a class of the same name as the script file exists in the Schema 16. If not, execution proceeds to step 44, in which a method designated "initializeClass" is called. Within the initializeClass method, schema templates are looked up based on the script file name. Using these templates and the name of the script file itself, a new schema is generated and compiled within the CIMOM 14 (step 46). Execution then proceeds to step 48. Similarly, if in step 42 it is determined that the class of the same name as the script file exists in the CIM Schema 16, execution proceeds directly to step 48.

In step 48, a method designated "getInstanceProviderInfo" is called. Within this method, the I/O redirection provider 20 registers to the CIMOM 14 all of the classes it will handle via a call to "info.addInstrumentedClass". At this point, the I/O redirection provider is registered to handle all classes for which it has accompanying scripts and waits for the CIMOM 14 to call into it.

FIG. 3 is a flowchart illustrating a request from the CIMOM to the I/O redirection provider. As shown in FIG. 3, when a client makes a request to a CIMOM class, such as "enumInstanceNames" (step 60), the CIMOM 14 compares the requested class with a list of classes registered with the CIMOM 14 (step 62). Assuming the requested class is one of the registered set for I/O redirection provider (step 64), the call is passed to the I/O redirection provider to handle. In response, the I/O redirection provider determines which of the scripts 22a-22d will handle the request (step 66). The I/O redirection provider 20 delegates a call to "ExecProperties. ccp", which invokes a method designated "enumInstanceNames." enumInstanceNames adds data to a class CIMPropertyArray and then calls a method designated "execScript" (step 70), which is where I/O redirection occurs, as illustrated in FIG. 4. Referring again to step 64, if the requested class is not one of the registered set for the I/O redirection provider, the call is passed to the appropriate one of the providers to handle (step 72).

FIG. 4 is a flowchart illustrating operation of the execScript method in accordance with one embodiment. In block 80, an integrity check is performed on the script to make sure it has not been tampered with. In block 82, the values of CIMPropertyArray (see FIG. 3, step 70) are serialized into a string, which is handed to a pipe and executed (steps 84-88). Output from the execScript sequence is captured (step 90) and converted into parameters for the I/O redirection provider 20, which then returns those values via a CIMPropertyArray back to the enumInstanceNames call (step 92).

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method of implementing an I/O redirection provider in a management system comprising a Common Information Model Object Manager ("CIMOM"), the method comprising:

for each of a number of script files, determining whether a class corresponding to the script file exists;

responsive to a determination that a class corresponding to the script file does not exist, selectively using at least one template to generate a new schema for the script file; and compiling the new schema within the CIMOM.

2. The method of claim 1 further comprising registering the I/O redirection provider to the CIMOM to handle all classes for which it has accompanying scripts.

3. The method of claim 1 further comprising awaiting receipt by the I/O redirection provider of a CIMOM request.

4. The method of claim 1 further comprising, responsive to receipt by the I/O redirection provider of a CIMOM request:
   determining whether a class specified in the CIMOM request is a class for which the I/O redirection provider has been registered with the CIMOM to handle; and
   responsive to a determination that the requested class is a class for which the I/O redirection provider has been registered with the CIMOM to handle, selectively passing the requested class to the I/O redirection provider for handling.

5. The method of claim 4 further comprising, responsive to receipt by the I/O redirection provider of the requested class, selecting one of the script files to handle the requested class.

6. The method of claim 5 wherein the I/O redirection provider utilizes the selected one of the script files to feed data to the CIMOM.

7. The method of claim 5 further comprising performing an integrity check on the selected one of the script files.

8. The method of claim 1 wherein each of the script files comprises a script written using a scripting language selected from a group consisting of python, perl, bash, and ruby.

9. The method of claim 1 wherein, for each of the script files, a name of the script file includes an .sh file extension.

10. A method of implementing an I/O redirection provider in a management system comprising a Common Information Model Object Manager ("CIMOM"), the method comprising:
    registering the I/O redirection provider to the CIMOM to handle all classes for which it has a corresponding script;
    awaiting receipt by the I/O redirection provider of a CIMOM request;
    determining whether a class specified in the CIMOM request is a class for which the I/O redirection provider has been registered with the CIMOM to handle;
    responsive to a determination that the requested class is a class for which the I/O redirection provider has been registered with the CIMOM to handle, selectively passing the requested class to the I/O redirection provider for handling; and
    responsive to receipt by the I/O redirection provider of the requested class, processing the requested class passed thereto in accordance with the corresponding script.

11. The method of claim 10 further comprising, responsive to receipt by the I/O redirection provider of the requested class and prior to processing, identifying the corresponding script.

12. The method of claim 11 further comprising utilizing by the I/O redirection provider the corresponding script to feed data to the CIMOM.

13. The method of claim 11 further comprising performing an integrity check on the corresponding script.

14. The method of claim 10 wherein each of the scripts comprises a script written using a scripting language selected from a group consisting of python, perl, bash, and ruby.

15. The method of claim 10 wherein, for each of the scripts, a name of the file comprising the script includes an .sh file extension.

16. An I/O redirection provider for implementation in a management system comprising a Common Information Model Object Manager ("CIMOM"), the I/O redirection provider comprising:
    means for determining, for each of a number of script files, whether a class corresponding to the script file exists;
    means responsive to a determination that a class corresponding to the script file does not exist for selectively using at least one template to generate a new schema for the script file; and
    means for compiling the new schema within the CIMOM.

17. The I/O redirection provider of claim 16 further comprising means for registering the I/O redirection provider to the CIMOM to handle all classes for which it has accompanying scripts.

18. The I/O redirection provider of claim 16 further comprising means responsive to receipt by the I/O redirection provider of a CIMOM request for determining whether a class specified in the CIMOM request is a class for which the I/O redirection provider has been registered with the CIMOM to handle and responsive to a determination that the requested class is a class for which the I/O redirection provider has been registered with the CIMOM to handle, selectively passing the requested class to the I/O redirection provider for handling.

19. The I/O redirection provider of claim 18 further comprising means responsive to receipt by the I/O redirection provider of the requested class for selecting one of the script files to handle the requested class, wherein the I/O redirection provider utilizes the selected one of the script files to feed data to the CIMOM.

20. The I/O redirection provider of claim 19 further comprising means for performing an integrity check on the selected one of the script files.

* * * * *